United States Patent

Leppek et al.

[11] Patent Number: 5,147,115
[45] Date of Patent: Sep. 15, 1992

[54] ADAPTIVE RELEASE APPLY ALGORITHM

[75] Inventors: Kevin G. Leppek, Troy; Martin A. Hogan, Farmington Hills, both of Mich.

[73] Assignee: General Motors Corporation, Detroit, Mich.

[21] Appl. No.: 734,079

[22] Filed: Jul. 22, 1991

Related U.S. Application Data

[63] Continuation-in-part of Ser. No. 509,700, Apr. 16, 1990, abandoned.

[51] Int. Cl.$^5$ .................................................. B60T 8/00
[52] U.S. Cl. .................................... 303/105; 303/100; 303/106; 364/426.02
[58] Field of Search ............... 303/100, 110, 115 EC, 303/115 R, 92, 93, 95, 97, 99, 113 R, 107, 108, 106, 105

[56] References Cited

U.S. PATENT DOCUMENTS

| | | | |
|---|---|---|---|
| 3,953,080 | 4/1976 | Bremer | 303/107 |
| 3,966,266 | 6/1976 | Atkins | 303/110 |
| 4,143,926 | 3/1979 | Miller | 303/105 |
| 4,673,225 | 6/1987 | Kade | 303/100 |
| 4,701,855 | 10/1987 | Fennel | 303/105 |
| 4,704,684 | 6/1987 | Kubo | 303/93 X |
| 4,824,184 | 4/1989 | Spadafora et al. | 303/100 |
| 4,844,556 | 7/1989 | Fennel et al. | 303/100 |
| 4,901,239 | 2/1990 | Yoshino | 303/106 |
| 4,916,619 | 4/1990 | Walenty et al. | 303/100 X |
| 4,917,445 | 4/1990 | Leppek et al. | 303/103 |
| 4,923,255 | 5/1990 | Braschel et al. | 303/97 |
| 4,932,726 | 4/1990 | Iwata et al. | 303/106 X |
| 4,938,544 | 7/1990 | Braschel et al. | 303/105 X |

Primary Examiner—Matthew C. Graham
Attorney, Agent, or Firm—Howard N. Conkey

[57] ABSTRACT

In an antilock braking system, when wheel parameters including slip represent an incipient wheel lockup condition normally calling for a release of brake pressure during a pressure apply mode of an antilock braking cycle and the duration of the pressure apply mode is less than a predetermined threshold representing an abnormal rapid cycling of the brake pressure, the wheel slip threshold representing an incipient wheel lockup condition is increased, the rate of increase in brake pressure during the brake pressure apply mode is set to a high level and the pressure apply mode is continued during which the wheel brake pressure is ramped at the increased rate. These steps are repeated while the wheel parameters represent an incipient wheel lockup condition normally calling for a release of brake pressure until the time of the pressure apply mode equals the predetermined threshold representing a normal brake pressure cycling period. At this time, the rate of pressure increase during the apply mode is returned to normal and the system is set to a release mode wherein the brake pressure is released. The slip threshold is thereby adjusted to establish normal brake pressure cycling.

8 Claims, 3 Drawing Sheets

ADAPTIVE RELEASE APPLY ALGORITHM

This is a continuation-in-part of application Ser. No. 07/509,700 filed on Apr. 16, 1990.

BACKGROUND OF THE INVENTION

This invention relates to an antilock control system for vehicle wheel brakes.

When the brakes of a vehicle are applied, a braking force is generated between the wheel and the road surface that is dependent upon a variety of parameters including the road surface conditions and the amount of slip present between the wheel and the road surface. This braking force increases as slip increases, until a critical value of slip is surpassed. Beyond the critical value of slip, the braking force decreases and the wheel rapidly approaches lockup. Therefore, to achieve stable braking, an antilock control system seeks to operate wheel slip at or near the critical slip value. An antilock control system achieves this by detecting an incipient lock condition. Upon detecting an incipient lock condition, the antilock control system releases pressure at the wheel brake. Once the wheel recovers from the incipient lock condition, brake pressure can be re-established. An incipient lock condition is typically represented by the magnitude of wheel deceleration exceeding a deceleration threshold value or slip exceeding a slip threshold value.

However, certain characteristics of the vehicle suspension and/or the road surface can cause the wheel to exhibit behavior as if it is approaching an incipient lock when in reality it is not. For example, on deformable road surfaces, the brake force-wheel slip relationship does not follow the relationship previously described where a critical slip is reached after which braking force decreases with increasing slip but instead follows the relationship wherein brake force continuously increases with increasing slip. In these cases, the antilock system takes corrective action (requesting a release of brake pressure) based upon the prediction that an incipient lock condition will soon exist. This release of pressure will then typically cause the wheel to suddenly exhibit a recovery condition. However, this exhibited recovery condition is short-lived, as the reapplication of pressure usually results in the prediction of an incipient lock condition and release of brake pressure in response thereto. Thus, a wheel recovery following a sensed incipient lock when an incipient lock condition does not in fact exist occurs much sooner than would a wheel recovery following a true incipient lock condition, and relatedly, an incipient lock condition following a recovery from a detected incipient lock when an incipient lock condition does not in fact exist also occurs much sooner than it would under normal conditions. This results in a rapid cycling behavior of the antilock system.

SUMMARY OF THE INVENTION

In general, the present invention provides for an improved antilock control system for a braked wheel that prevents rapid cycling of brake pressure in response to vehicle and/or road surface conditions.

In one aspect of the invention, the antilock control system adapts it parameters so as to achieve normal brake pressure cycling under all braking conditions.

In yet another aspect of the invention, the conditions for sensing an incipient wheel lockup conditions are made more stringent when excessively rapid cycling of the brake pressure is sensed so as to reestablish a normal brake pressure cycling.

In one form of the invention, the release threshold representing an incipient wheel lockup condition is adaptively adjusted in response to a sensed excessively rapid cycling of the brake pressure until a normal brake pressure cycle time is established. In addition, the rate of pressure reapplication is increased in response to the sensed excessively rapid cycling of the brake pressure.

In operation of the preferred form of the invention, when wheel parameters (including wheel slip) represent an incipient wheel lockup condition normally calling for a release of brake pressure during a pressure apply mode of the antilock braking cycle (including at least a pressure apply mode during which wheel brake pressure is increased and a pressure release mode during which wheel brake pressure is released) and the duration of the pressure apply mode is less than a predetermined threshold (a condition representing abnormal rapid cycling of the brake pressure as a result of, for example, braking on a deformable surface), the wheel slip threshold representing an incipient wheel lockup condition is incremented, the rate of increase in brake pressure during the brake pressure apply mode is set to a high level and the pressure apply mode is continued during which the wheel brake pressure is ramped at the increased rate. These steps are repeated while the wheel parameters represent an incipient wheel lockup condition normally calling for a release of brake pressure until the time of the pressure apply mode equals the predetermined threshold representing a normal brake pressure cycling period. At this time, the rate of pressure increase during the apply mode is returned to normal and the system is set to a release mode wherein the brake pressure is released. The slip threshold adjusted as set forth above is left unchanged. When the wheel parameters indicate recovery from the incipient wheel lockup condition the pressure apply mode is again initiated to reapply brake pressure. Through the adjustment of the slip threshold as described above, the cycle period of the antilock braking cycle is returned to normal. If at any time the wheel slip exceeds a predetermined high slip limit (as will occur, for example, when the road surface returns to a non-deformable surface), the slip threshold representing an incipient wheel lockup condition and the rate of pressure increase are returned to their initial calibration values after which the system is set to a release mode wherein the brake pressure is released.

DESCRIPTION OF THE DRAWINGS

The invention can be better understood by referencing the preferred embodiment and drawings in which.

DESCRIPTION OF THE INVENTION

Figure 1:
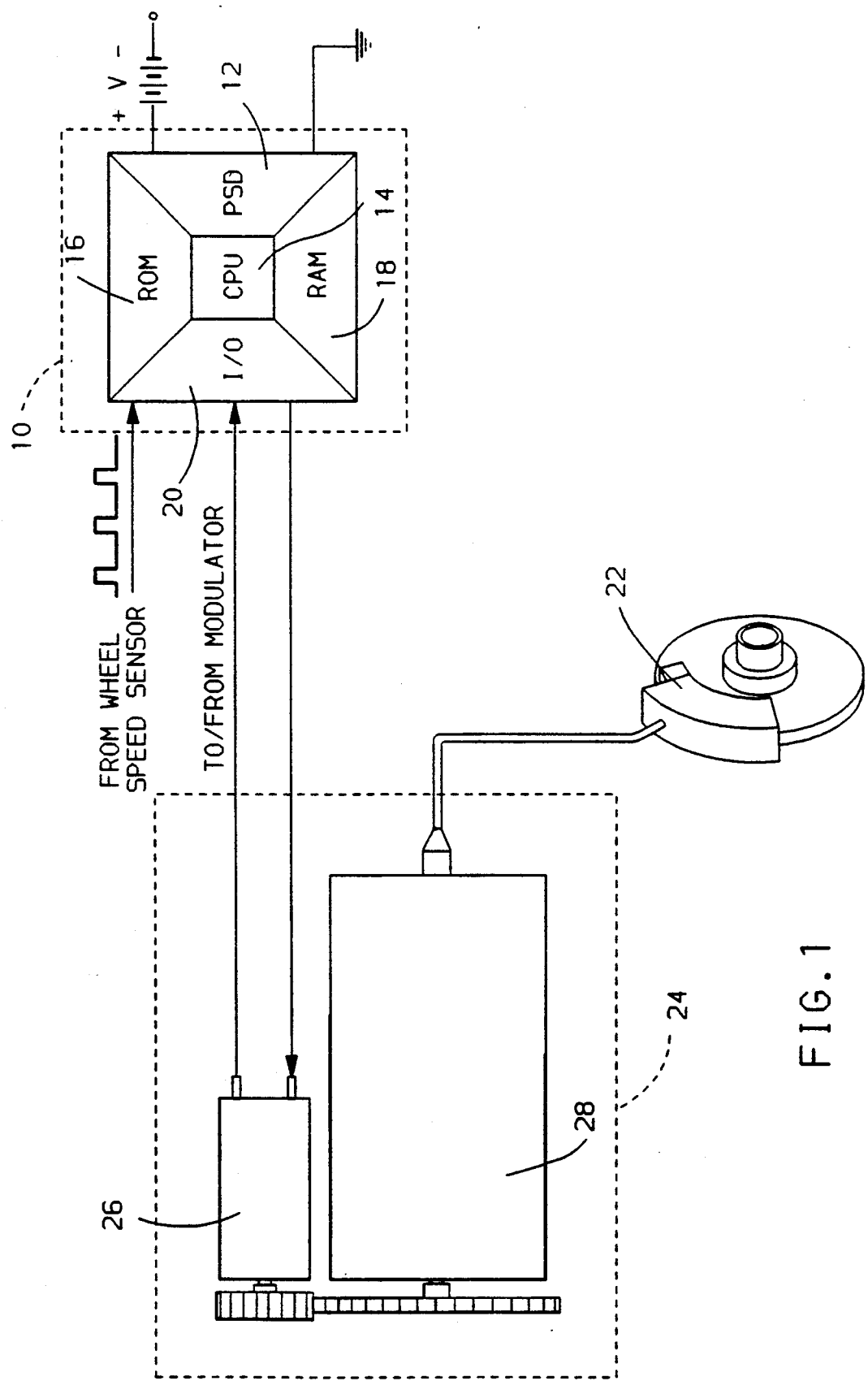
FIG. 1 is a diagram of the antilock control system.

An overview of the antilock braking system is shown in FIG. 1. The controller 10 consists of a conventional digital computer that includes a power supply device (PSD) 12 that interfaces the controller to the vehicle power system, a central processing unit (CPU) 14 which executes instructions and processes information, read-only memory (ROM) 16 in which the instructions necessary to perform the steps embodying the invention are stored, random-access memory (RAM) 18 which is used for storing variables and computational parameters, and input/output circuitry (I/0) 20 that interfaces external control signals to the digital computer. The computer 10 may, for example, take the form of the Motorola Single Chip Microcomputer MC68HCll. The I/0 20 receives information from devices such as from standard wheel speed sensors and the modulator 24, and sends information to the modulator and other external devices. The modulator 24, in this embodiment consisting of a linear motor 26 and piston actuator 28, is connected to the wheel brake 22. Thus, the antilock control system is comprised of a controller 10, which, through the execution of the instructions encoded in ROM 16, reads external information through the I/0 20 and sends commands to the modulator 24 to vary the pressure at the wheel brake 22.

Figure 2:
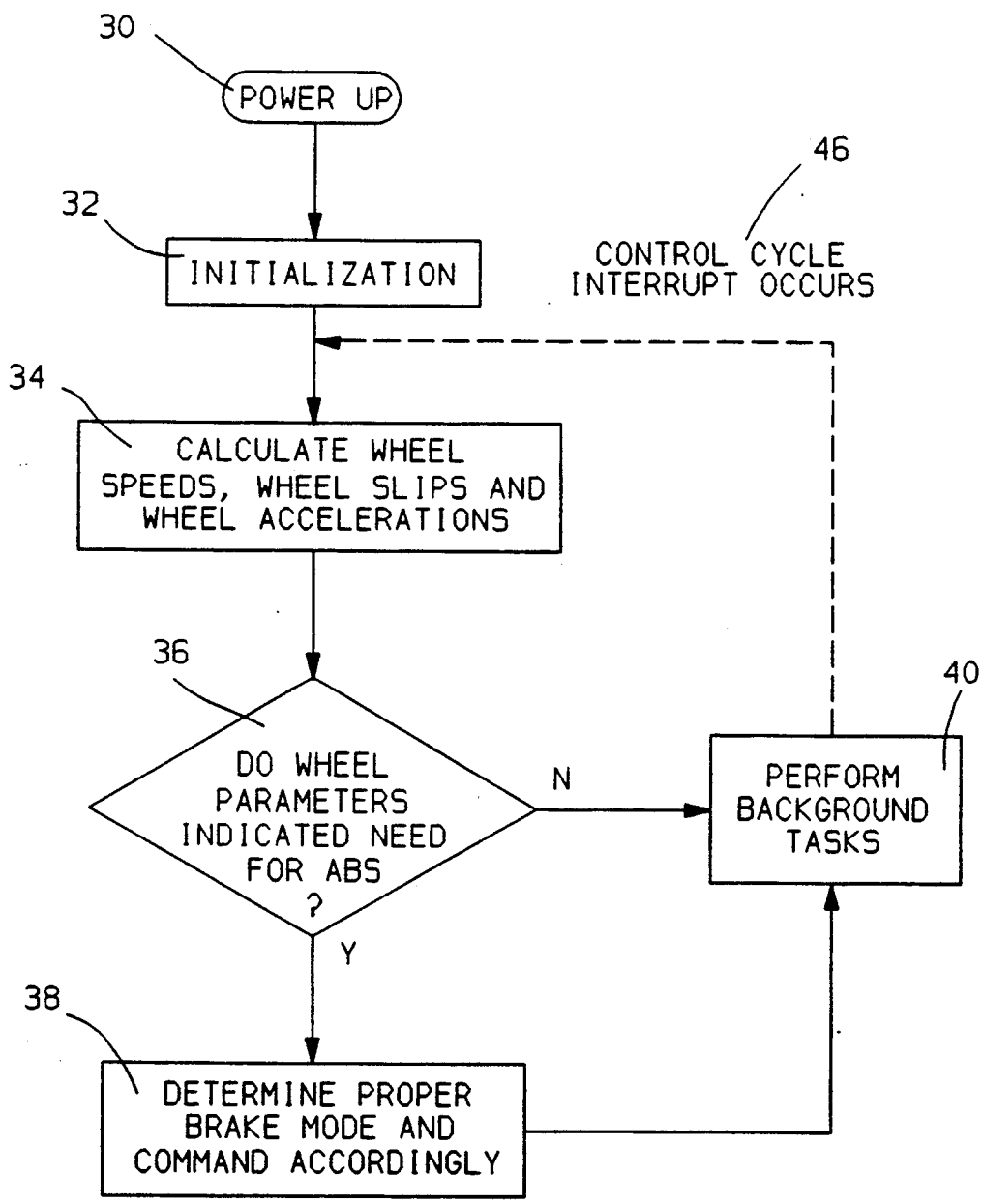
FIGS. 2 and 3 are flow charts depicting the operation of the system of FIG. 1.
Figure 3:
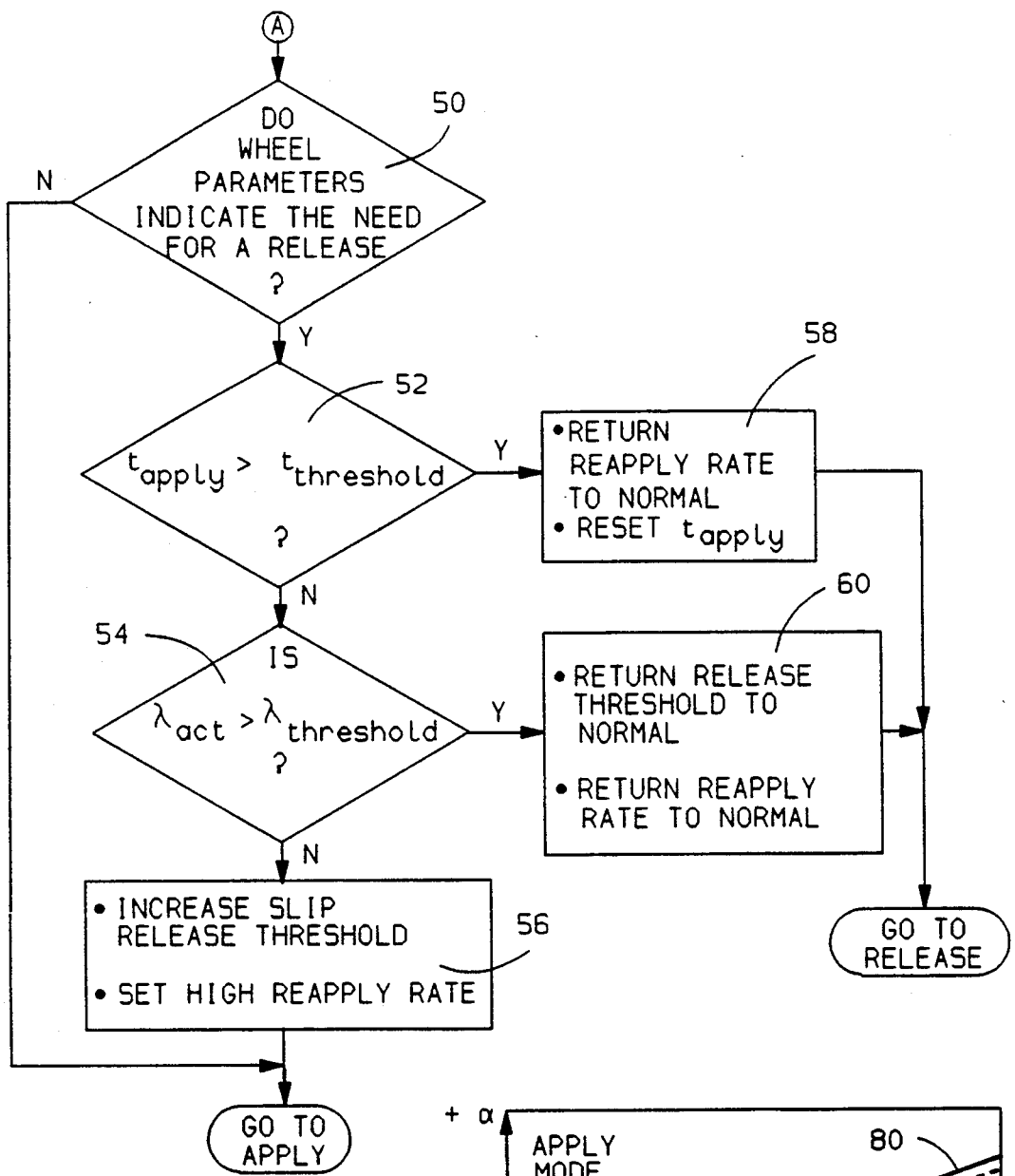

The algorithm embodying this invention is detailed in FIGS. 2 and 3. It should be briefly noted that, in describing the invention, references will be made to general tasks depicted in flow chart function blocks <nn>. Through the use of ordinary skill in the art, one could utilize any of a number of information processing languages in order to perform these tasks using a digital computer. Also, devices other than a digital computer could be utilized to perform the same or a similar function to the tasks of function blocks <nn>.

The basic antilock control algorithm is shown in FIG. 2. When the controller is powered up <30>, using the vehicle ignition or other convenient means, the digital computer begins executing the instructions encoded in ROM 16. The first task after power up <30> is initialization <32>. Initialization <32> entails setting various RAM 18 variables to calibrated values, stabilizing voltage levels at the I/0 20, confirming external circuit integrity and other functions.

Once initialization <32> is complete, the digital computer begins the control cycle tasks. The control cycle tasks are tasks that are executed once every control cycle, such as once every 5 msec. The first basic task of the control cycle is to read the wheel speed signal information and calculate the wheel dynamic parameters of wheel speed, acceleration and slip <34>. Then, the need for antilock brake pressure modulation is determined based on the determined values of wheel acceleration and slip <36>. If antilock control is needed, the digital computer determines the proper brake pressure mode and commands the modulator to adjust the wheel brake pressure accordingly <38>. Once this is done, or if antilock control was not needed, the digital computer proceeds to perform the background tasks <40>. The background tasks <40> include functions such as performing system self-check diagnostic tests, communicating with off-board devices (such as service tools and other vehicle computers) as well as other application specific functions. These control cycle tasks are executed once every control cycle. Thus, when a control cycle interrupt occurs <46>, a new control cycle begins and the digital computer executes blocks <34> through <40> as was previously described.

A typical antilock braking cycle performed via repeated executions of the foregoing steps <34,36,38> is as follows. When the wheel slip and acceleration conditions represent an incipient wheel lockup condition, a pressure release mode is indicated and brake pressure is quickly released to allow the wheel to recover from the incipient wheel lockup condition. When wheel acceleration and slip conditions represent a recovered condition, an apply mode is indicated and wheel pressure is reapplied, such as to a significant fraction of the wheel pressure at the time pressure was released, and thereafter ramped until another incipient wheel lockup condition is sensed at which time the release mode is indicated and the cycle is repeated.

As previously indicated, certain characteristics of the vehicle suspension and/or the road surface may result in the above brake pressure cycling being at an abnormally high rate. FIG. 3 illustrates the portion of the control cycle embodied in step <38> of FIG. 2 that senses this abnormal brake pressure, cycling, reestablishes normal brake pressure cycling and prevents an overall decrease in brake pressure during the period of the excessive cycling.

Prior to entry into the portion of the routine illustrated in FIG. 3, the computer has already determined the proper brake mode based upon the values of wheel deceleration and wheel slip. If these parameters do not call for a release of brake pressure so that step <38> is indicating an apply mode <50>, the digital computer simply exits this portion of the routine of step <38> and continues on with the other control cycle tasks associated with the apply mode including the ramping of the brake pressure. However, if the wheel acceleration and slip call for a release of brake pressure, then the digital computer determines if the duration apply of the most recent apply mode is less than the time $t_{threshold}$ which represents a normal cycle period <52>. A period less than $t_{threshold}$ represents an excessive cycling condition of the brake pressure. As previously indicated, this rapid cycling in response to the wheel acceleration and slip is typical of the system response to vehicle braking on a deformable surface.

In this embodiment, the calibration time $t_{threshold}$ represents a minimum cycling period below which the antilock system is unable to reapply as much pressure as it releases using the normal pressure reapplication rate. Thus, if $t_{apply}$ is less than $t_{threshold}$, the cycling frequency is below acceptable limits and it is likely that overall brake pressure is decreasing.

The digital computer next determines whether the measured wheel slip, $\lambda_{act}$, is greater than a maximum allowable slip threshold $\lambda_{threshold}$ <54>. This slip threshold is equal to a value of slip such as 30% above which a decrease in brake pressure is desirable under normal conditions even with low values of wheel deceleration.

Assuming the wheel slip is not greater than the maximum allowable, the computer increases the slip threshold for detecting an incipient wheel lockup condition and increases the reapply rate of the brake pressure to a high rate <56>. The increase in the slip threshold makes the conditions for sensing an incipient lockup more stringent which has the effect of increasing the apply/release cycle time. The increase in the reapply rate of brake pressure during the apply mode prevents a decrease in brake pressure due to the rapid cycling. Following step <56>, the computer continues with the other tasks associated with the apply mode including the ramping of the brake pressure at the high rate established at <56> and the timing of the apply mode.

As long as $t_{apply}$ of the apply mode is less than $t_{threshold}$ and the wheel slip $\lambda_{act}$ remains less than $\lambda_{threshold}$, the slip threshold for detecting an incipient wheel lockup condition is repeatedly increased at <56> at the interrupt interval.

Figure 4:
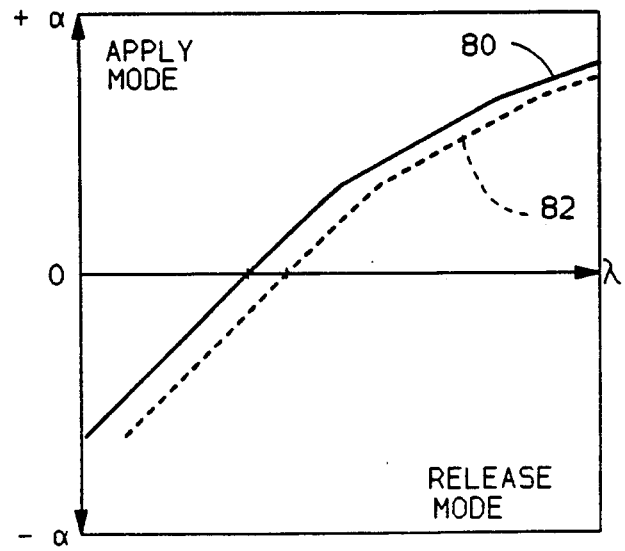
FIG. 4 is a diagram illustrating the adaptive release threshold provided by the operation of the system of FIG. 1.

The result of the foregoing is illustrated in FIG. 4 which depicts the conditions for establishing the apply and release modes. As viewed in this FIGURE, curve 80 illustrates the normal boundary between the apply and release modes as a function of wheel acceleration $\alpha$ and wheel slip $\lambda$. Conditions defining a point on one side of the boundary represent an incipient wheel lockup condition and on the other side a recovered condition. The increase in the slip threshold established by <56> effectively shifts the boundary such as to dashed curve 82 to make the conditions representing an incipient wheel lockup condition calling for release of brake pressure more stringent. In one embodiment, the boundary conditions of FIG. 4 are implemented via a lookup table in the read-only memory addressed by wheel acceleration and slip and the increase in the release threshold effecting the shift in the boundary is accomplished at <56> by decreasing the actual wheel slip value computed at <34> for use in addressing the lookup table. The result of this shift is a larger actual wheel slip is required to establish the conditions representing an incipient wheel lockup calling for a release of the brake pressure.

When the wheel parameters of acceleration and slip represent an incipient lockup condition based on the increased threshold established by <56> and step <52> determines the time $t_{apply}$ of the apply mode has become greater than the threshold value $t_{threshold}$ representing a normal brake cycle time, the reapply rate is returned to normal and $t_{apply}$ is reset <58> after which the computer continues on with the tasks associated with the release mode including the release of brake pressure to allow recovery from the incipient lockup condition. It will be noted that the adjusted slip threshold represented by the curve 82 of FIG. 4 is retained. In this manner, the system adapts to the conditions giving rise to the rapid cycling to reestablish normal brake pressure cycling.

When the conditions giving rise to the rapid cycling terminate such as the road surface changing from deformable to non-deformable, wheel slip will typically rapidly increase toward lockup. When the slip exceeds $\lambda_{threshold}$ over a pressure apply interval less than $t_{threshold}$ <52,54>, the release/apply threshold is returned to normal (curve 80 of FIG. 4) and the reapply rate is returned to normal <60> after which the computer continues with the other control tasks associated with the release mode. Thereafter, as long as the brake pressure cycling rate is determined to be normal <50,52>, the normal apply release boundary conditions are utilized <58>.

In the foregoing manner, the system automatically responds to a rapid cycling condition and adapts its parameters to reestablish a normal cycling condition and automatically returns to the normal parameters when the conditions causing the rapid cycling condition terminate.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A method of limiting the brake pressure applied to the brake of a vehicle wheel traveling over a road surface, the method comprising the steps of:
   cyclically (A) detecting a brake pressure release condition when a condition of the wheel exceeds a release condition threshold indicating an incipient wheel lockup condition, (B) releasing brake pressure to allow wheel recovery when a brake pressure release condition is detected, and (C) reapplying brake pressure following wheel recovery until a brake pressure release condition is again detected;
   detecting a predetermined rapid cycling condition of the cyclic detection, releasing and reapplying; and
   progressively increasing the release condition threshold while the rapid cycling condition is detected.

2. The method of claim 1 wherein the condition of the wheel includes slip between the wheel and the road surface, the release condition threshold includes a wheel slip threshold value and the step of progressively increasing the release condition threshold includes progressively increasing the wheel slip threshold value.

3. A method of limiting the brake pressure applied to the brake of a vehicle wheel traveling over a road surface, the method comprising the steps of:
   cyclically (A) detecting a brake pressure release condition when a condition of the wheel exceeds a release condition threshold indicating an incipient wheel lockup condition, (B) releasing brake pressure to allow wheel recovery when a brake pressure release condition is detected, and (C) increasing the brake pressure at a ramp rate following wheel recovery until a brake pressure release condition is again detected;
   detecting a predetermined rapid cycling condition of the cyclic detection, releasing and increasing; and
   when the rapid cycling condition is detected, (A) increasing the release condition threshold and (B) increasing the ramp rate of the ramped brake pressure from an initial rate.

4. The method of claim 3 wherein the increasing of the release condition threshold is repeated to progressively increase the release condition threshold until a normal cycling condition is detected.

5. The method of claim 4 further including the step of returning the ramp rate to the initial rate when a normal cycling condition is detected.

6. The method of limiting the brake pressure applied to the brake of a vehicle wheel traveling over a road surface, the method comprising the steps of:
   sensing a brake pressure release condition when a condition of the wheel exceeds a release condition threshold indicating an incipient wheel lockup condition;
   timing the duration of brake pressure application;
   repeatedly increasing the release condition threshold from an initial level when a brake pressure release condition is sensed while the timed duration is less than a predetermined period representing a normal cycling period;
   applying brake pressure when the condition of the wheel represents a wheel recovered condition or when a brake pressure release condition is sensed while the timed duration is less than the predetermined period; and
   releasing brake pressure to allow wheel recovery from the incipient wheel lockup condition in response to a sensed brake pressure release condition when the timed duration exceeds the predetermined period.

7. The method of claim 6 further including the step of returning the release condition threshold to the initial level when the condition of the wheel exceeds a predetermined high level.

8. The method of claim 7 wherein the condition of the wheel is slip between the wheel and the road surface.

* * * * *